United States Patent
Nelson et al.

[11] Patent Number: 6,052,485
[45] Date of Patent: Apr. 18, 2000

[54] FRACTAL FEATURES USED WITH NEAREST NEIGHBOR CLUSTERING FOR IDENTIFYING CLUTTER IN SONAR IMAGES

[75] Inventors: Susan R. Nelson; Susan M. Tuovila, both of Panama City, Fla.

[73] Assignee: The United States of America as represented by the Secretary of the Navy, Washington, D.C.

[21] Appl. No.: 08/794,521

[22] Filed: Feb. 3, 1997

[51] Int. Cl.[7] .................................................. G06K 9/62
[52] U.S. Cl. ........................... 382/225; 382/275; 382/291
[58] Field of Search .................................. 382/225, 103, 382/291, 249, 270, 275

[56] References Cited

U.S. PATENT DOCUMENTS

| | | | |
|---|---|---|---|
| 4,005,415 | 1/1977 | Kossiakoff et al. | 342/90 |
| 4,907,156 | 3/1990 | Doi et al. | 382/130 |
| 4,975,974 | 12/1990 | Nishijama et al. | 382/221 |
| 5,040,133 | 8/1991 | Feintuch et al. | 702/102 |
| 5,054,101 | 10/1991 | Prakash | 382/270 |
| 5,181,254 | 1/1993 | Schweizer et al. | 382/100 |
| 5,214,744 | 5/1993 | Schweizer et al. | 382/103 |
| 5,239,596 | 8/1993 | Mahoney | 382/180 |
| 5,345,242 | 9/1994 | Roberts et al. | 342/159 |
| 5,384,860 | 1/1995 | Gardemal, Jr. et al. | 382/103 |
| 5,493,619 | 2/1996 | Haley et al. | 382/199 |
| 5,519,789 | 5/1996 | Etoh | 382/225 |
| 5,537,488 | 7/1996 | Menon et al. | 382/170 |
| 5,537,491 | 7/1996 | Mahoney et al. | 382/218 |
| 5,544,256 | 8/1996 | Brecher et al. | 382/149 |
| 5,574,212 | 11/1996 | Madsen et al. | 73/1.82 |
| 5,612,928 | 3/1997 | Haley et al. | 367/11 |
| 5,621,815 | 4/1997 | Talukdar et al. | 382/159 |
| 5,631,982 | 5/1997 | Inselberg et al. | 382/281 |
| 5,734,744 | 3/1998 | Wittenstein et al. | 382/166 |

*Primary Examiner*—Joseph Mancuso
*Assistant Examiner*—Martin E Miller
*Attorney, Agent, or Firm*—Harvey A. Gilbert; Kenneth W. Dobyns

[57] ABSTRACT

A method is presented for identifying clutter in an image such as a sonar image. A detection scheme identifies portions of the image having a signal-to-noise ratio greater than a given threshold. A classification scheme is then applied to each such portion to generate fractal feature values associated therewith in order to classify the portion as a target or non-target. For clutter identification, each portion is assigned to a group based on a distance from the position of each portion to another of the portions that is its nearest neighbor. A series of tests are then performed for each group using the fractal feature values associated with each portion in each group. A failure of any of the series of tests by a group identifies each portion associated with that group as clutter in the image.

16 Claims, 5 Drawing Sheets

FRACTAL FEATURES USED WITH NEAREST NEIGHBOR CLUSTERING FOR IDENTIFYING CLUTTER IN SONAR IMAGES

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The invention relates generally to the evaluation of sonar images, and more particularly to a method for automatically identifying clutter in a sonar image represented by an array of pixel intensities.

BACKGROUND OF THE INVENTION

The process of detection in image processing consists of the identification and location of areas within an image that bear further scrutiny because they many contain a target of interest. Classification is a more detailed and rigorous scrutiny of each detected area to decide if the detected area indeed contains a target with the proper characteristics.

The purpose of the detection and classification process for sonar images is to identify targets, such as sea mines, that pose a danger to navy assets so that the targets can be avoided or neutralized. Because of the mission, a primary goal for all detection and classification strategies is to maximize the joint probability of target detection and classification or $P_dP_c$ as it is known. One inevitable result of this strategy is a high $P_dP_c$ also produces a high number of false alarms or false target detections.

A false target is defined as an object that has been positively classified as a target, when in fact, no object is present in the groundtruth. Many of these false targets are actually part of image clutter formations. For sonar images, image clutter may represent actual physical bottom clutter or it may be created by the sonar data collection process. Examples of sonar image clutter include areas of high reverberation, high signal gain, sonar motion effects, and random speckle created by areas of constructive and destructive interference in the sonar signal return. To achieve a sufficiently low false target rate when analyzing sonar images, image clutter must be identified so that false targets resulting from image clutter do not hinder the visibility and correct classification of real targets. However, there are no sonar systems or automated detection schemes that use any kind of automated clutter recognition.

Currently, clutter recognition in sonar images is done by a human operator. The operator attempts to identify image clutter and the false targets resulting from same by visual examination of the image which is typically represented by an array of pixels on a display. The target-like objects are visually tracked through the image to see if they are part of a larger clutter structure. Another image clutter handling scheme involves counting the number of detections in an image. If the number of detections is high, the image is considered to be cluttered. The detection threshold is then continuously raised until the number of detections decreases to some manageable number. While the number of false targets is reduced, a number of detected real targets that were in the cluttered image can be eliminated from evaluation.

SUMMARY OF THE INVENTION

Accordingly, it is an object of the present invention is to provide a method for automatically identifying clutter in an image.

Another object of the present invention is to provide a method of identifying and removing clutter from a sonar image that can be represented by an array of pixels of varied intensity.

Still another object of the present invention is to provide a method that presents a sonar operator with a sonar image that has been automatically evaluated to eliminate false targets caused by clutter while providing a high-degree of confidence that the targets shown are real targets.

Other objects and advantages of the present invention will become more obvious hereinafter in the specification and drawings.

In accordance with the present invention, a method is presented for identifying clutter in an image that is represented by a two-dimensional array of pixel intensities. A detection scheme is first applied to the two-dimensional array to identify portions of the image having a signal-to-noise ratio greater than a given threshold. Each such portion is centered at a position in the image that is represented by a two-dimensional coordinate pair generated by the detection scheme. A classification scheme is then applied to each portion to generate fractal feature values associated therewith. As a result, each portion is classified as a target or non-target based on the portion's fractal feature values. Each portion is assigned to a group based on a distance from the position of each portion to another of the portions that is its nearest neighbor. A series of tests are performed for each group using the fractal feature values associated with each portion in each group. A failure of any of the series of tests by a group identifies each portion associated with that group as clutter in the image.

DETAILED DESCRIPTION OF THE INVENTION

Figure 1:
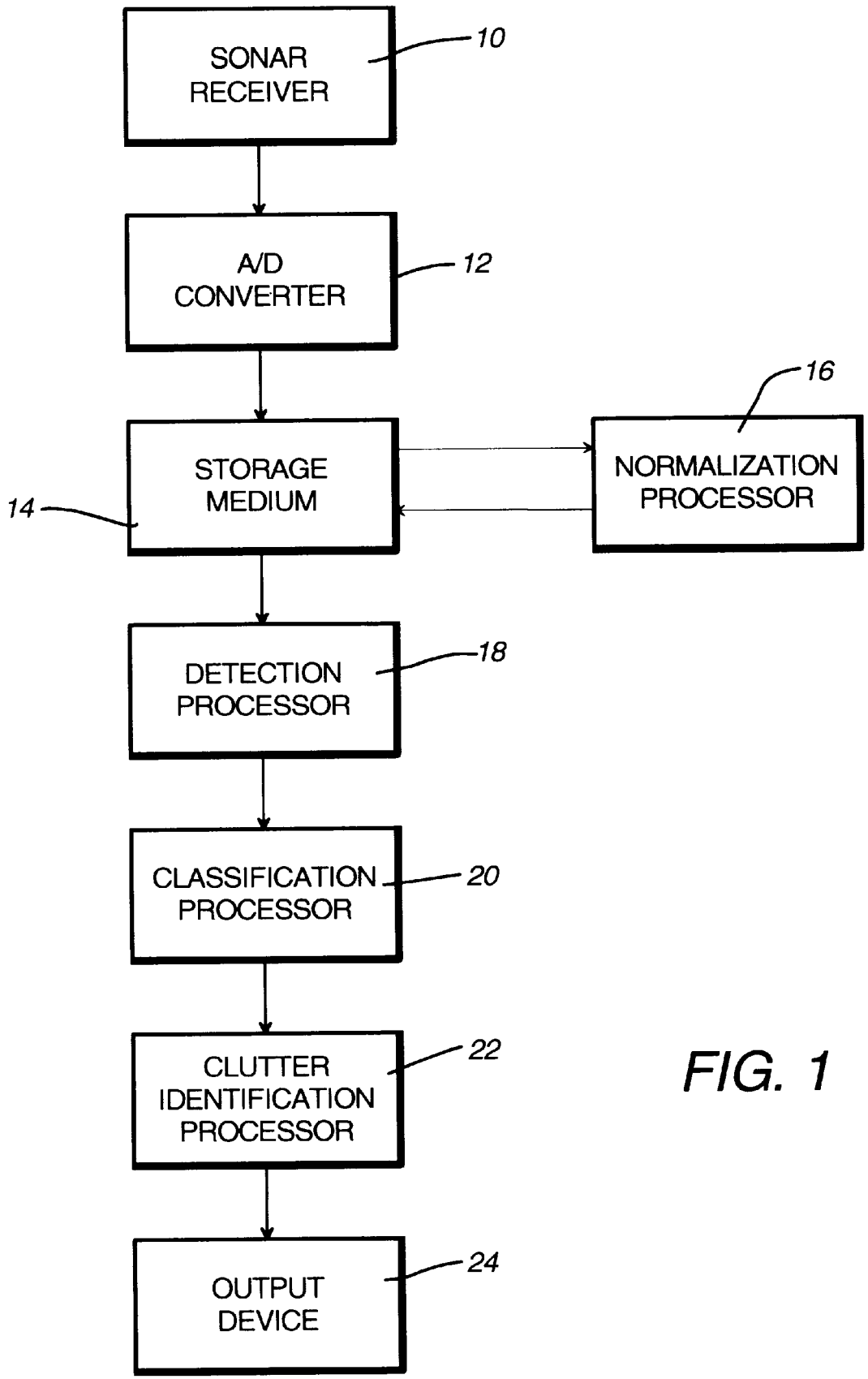
FIG. 1 is a functional block diagram of a sonar system incorporating the processing elements for carrying out the clutter identification method of the present invention for a sonar image.

The present invention can be applied to broad classes of imaging situations in which clutter must be identified for good target discrimination. By way of example, the present invention will be explained as it relates to a sonar image in which mine-like targets are to be detected/classified in the presence of clutter. However, the present invention can be used to identify clutter in radar images, satellite images, x-ray images, MRI images, or any other image that can be represented by an array of pixels of varied intensity.

The method of clutter identification described below relies on texture determination related to image contrast using parameters related to fractal geometry. The method used here is based on the efficient computation of fractal features which relate texture to feature scale and distribution. Accordingly, to better understand the method, some background on fractal geometry will be discussed.

The term fractal refers to classes of sets and surfaces which, due to their irregularity and/or fragmentation, possess non-integer (i.e., real-valued) textural dimensions that exceed their topological dimensions. Many naturally occurring patterns and processes are more accurately modeled by fractals than by classical Euclidean surfaces. Some naturally occurring surfaces with irregular textures that have been successfully modeled using fractal properties include clouds, mountain terrain, and the sea bottom. Man-made objects, e.g., mines, generally have smooth surfaces and definite shapes. Such objects will be less fractal-like in nature and thus produce calculated fractal features values that are less than fractal feature values associated with naturally occurring or irregularly-shaped objects. This fact makes it possible to distinguish a mine from the natural sea bottom.

In addition to being characterized by real-valued fractal dimensions, fractal surfaces also possess the qualities of irregularity and self-similarity. Irregularity means that the surface cannot be defined by smooth boundaries and so the perimeter and surface area cannot be exactly measured or calculated. Self-similarity means that, over some range of measurement scales, each scaled piece of the surface displays the same form as the whole surface. In other words, the appearance and statistical properties of the surface do not appreciably change.

A two-dimensional image actually has two calculable fractal dimensions, one for each of its two topological dimensions. The two fractal dimensions correspond to the average variation in texture, or pixel intensity, in the X and Y directions. (A pixel is defined herein as the smallest level of resolution in an image.) Each fractal dimension over a given image area should have a value between 2 and 3 if fractal characteristics are present. Although an image representing a physical surface has a third topological dimension (i.e., the height of physical structures), an image maps the surface with a two-dimension snapshot that reduces three-dimensional geographical information (as well as target echoes and sensor and display related phenomena such as speckle, reverberation, quantization noise, and gain signals) into a single pixel intensity for each image portion.

The invention described herein discriminates between objects having specific characteristics (e.g., man-made targets such mines) and clutter within a two-dimensional image. The method can be used on any type of image in which a surface or scene can be represented by image pixel intensities. Briefly, analog data collected from sensors is converted to digital data and normalized. A detection scheme is used to find objects in the image that have characteristics like those of the sought target. The whole normalized image, a list of the center coordinates of identified target-like objects from the detection scheme, and the number of identified objects are passed to a fractal-based classification scheme. The classification scheme calculates features associated with the detected objects and uses the values and patterns of these features to classify objects as either targets or non-targets. Outputs from the classification scheme are then passed to the clutter identification scheme of the present invention that calculates group features associated with the positively classified targets and uses the values and patterns of these group features to differentiate real targets from image clutter.

The clutter identification method of the present invention can be used with any type of target detection and classification schemes so long as these schemes result in a set of fractal-based object classification features that give a good description of the classified object. The clutter identification scheme identifies image clutter by assigning all possible targets that have been identified by a target detection scheme to a series of object groups. Features associated with both the object and its parent group are then used to determine if each object is a real target or part of an image clutter formation. That is, the attributes of each group and its objects are used to reject either objects within the group or the entire group as a clutter formation. The remaining objects are then accepted as real targets.

By way of non-limiting example, suitable detection and classification schemes are disclosed in U.S. patent application Ser. No. 08/629,709, entitled "High-order Fractal Feature Extraction For Classification of Objects in Images," filed on Apr. 9, 1996, by the same inventors. The contents of this application are hereby incorporated by reference and described briefly below.

Referring now to the drawings, and more particularly to FIG. 1, raw analog data is collected using a sonar receiver 10. The data is digitized by A/D converter 12 and stored in storage medium 14 as pixel intensities. For example, each raw image might be stored in a separate disk file as integer data valued between 0 and 255, inclusive. These values represent image pixel intensities where, for example, 0 represents minimum intensity and 255 represents maximum intensity. In terms of a grey scale, 0 is represented by black and 255 is represented by white.

Sequential pings received by sonar receiver 10 are aligned vertically along the Y-axis. Each pixel represents a specific range/ping cell. The raw image file is read from storage medium 14 in a sequential ping-by-ping manner and normalization routine is applied by normalization processor 16. The normalized image data can then be re-stored in storage medium 14.

In this invention, normalized images are used by the fractal-based classification and clutter identification schemes instead of unnormalized images. Normalization produces a consistent statistical background distribution of pixel intensities across each image in a data set while retaining targets of interest. Background normalization removes artifacts such as signal attenuation with range, the effects of gain functions, and transient events, while retaining target highlights and shadows. In an unnormalized sonar image, pixel intensity decreases with increasing range because of signal attenuation, or may vary because of applied time varying gain. Closer ranges may exhibit a banding effect created by side lobes and ripples in the sonar vertical beam pattern. Normalization imposes consistency among all images in a data set, produces a more uniform background within an image, allows for uniform detection and classification criteria (i.e., thresholds) across an image, and allows comparisons to be made among the images in the set. One such normalization scheme will now be explained.

Normalization is applied to a digitized image in a sequential ping-by-ping manner. Sequential pings are aligned vertically along the Y-axis while range is aligned horizontally along the X-axis. A moving arithmetic average over seven range cells (i.e., seven pixels) is applied across all range cells in a ping, resulting in an assigned interim mean pixel intensity for each range cell (i.e., each pixel). Automated gain control is performed on the image by maintaining a time history of all previously read pings in the form of a running mean for each range cell. A time constant is then applied that weights the mean intensity level at each range cell across all past pings more heavily than the mean for the current single ping. For each range cell in the ping, a new running mean is calculated. This continues for all pings in the image. The final normalized intensity level for each range/ping cell is an integer clipped between 0 and 255, inclusive.

Detection in the present invention can be carried out by detection processor 18. The detection operation can be defined as the discrimination of an object from its background and its designation as a potential target of interest that bears further investigation. An object is any region of the (sonar) image that has a significantly higher signal-to-noise (i.e., background) ratio than the average background level of nearby areas of the image. The detection scheme used in the illustrated embodiment recursively sorts image pixels into background, target highlight, and target shadow pixels. The output of the detection scheme is a list of center coordinates (range, ping listed as $X_c, Y_c$) of detected objects and the number of objects detected. In this way, the detection scheme identifies areas of the image that contain possible targets of interest. Typically, many passes are made over the data since there are often several or different target class sizes to be considered. Both an intensity threshold and a pixel count threshold have to be satisfied for a detection to be declared. Data windows, whose sizes are determined by expected target sizes, are moved across the pixel data. The intensity of each pixel within the window is compared to an intensity threshold. If a pixel exceeds this threshold, the target pixel count is incremented by one. The pixel count threshold is derived from the expected target size and a worse case target orientation. It is set to the number of pixels required to cover approximately three fourths the length of the target. When this threshold is reached by the target pixel count, the object is declared a target and the center coordinates $(X_c, Y_c)$ can be stored and/or made available to classification processor 18.

The fractal-based classification scheme used in the illustrated embodiment examines fractal feature values for different classes of objects. For example, two classes can be mine-like targets and non-targets. To effectively use the classification scheme, a training session must be conducted on known target data or groundtruth. Using the groundtruth data, background images and values passed from detection processor 16, fractal feature values are calculated. Using these calculated values as guides, appropriate threshold limits for each calculated feature are set. Classification thresholds are places where there appears to be significant breakpoints between target and non-target values for each feature. Once all thresholds have been given values, the classification scheme is ready to be used on unknown images of the same type on which it was trained.

In the illustrated classification scheme, the center of a fractal window or box is placed at a certain position (X,Y) on the image. The fractal dimension Df is calculated over all pixels falling within the box, and all pixels within the box are assigned that fractal dimension value. The X, Y, or an average dimension value may be used as appropriate for the type of image. This process is repeated multiple times for an image using different fractal box sizes for different predicted target sizes. Using a big box for fractalization produces targets with duller highlights as compared to using a small box for fractalization. This is because the inclusion of more background in the big box lowers average pixel intensities in the vicinity of the target. Fractal box size is based on characteristics of the image data set and predicted target characteristics. Using a smaller box will retain much of the speckle and other noise that may contaminate an image but also retains more detail of imaged objects. Using a box that is bigger reduces the average intensity level of both imaged noise and imaged objects, resulting in less sharp object detail.

Finding two (or more) separate fractal dimensions for two fractal box sizes, and the magnitude of their dimensional differences, yields valuable information about an image area. If the two fractal box sizes generate very similar fractal feature values, this is an indication the image in that area is fairly uniform, i.e., the area is probably a background or other non-target area. On the other hand, if the small box dimension contains a target and the big box contains both a target and background, then there will be a sufficient amount of difference to indicate a target.

The fractal dimension for two (or more) different box sizes is determined and then two high-order first derivative quantities (i.e., the magnitude and direction of the gradient between the two or more fractal dimension values) are determined. The reasoning behind this is that for a background area there will be less difference between the gradient magnitudes than if one box contains a target or an edge. The direction of the gradient is important because a man-made object will have a steeper slope than an area of background or clutter. The direction indicates what type of structure lies beyond the gradient, i.e., is the transition to an area of background, clutter, or a man-made object. Determination of the high-order second derivative fractal features are used as a measure of the longevity or sustainability of the target, i.e., how long the fractal dimension continues to meet the definition of a target.

The values of the fractal features across the image are used to make classification decisions based on the changing distribution of the features across the image. As a result, classification processor 18 outputs the fractal feature values as well as indications as to whether the various sets of fractal feature values (associated with the defected objects) are indicative of a target or non-target. These outputs are then made available to clutter identification processor 22.

Processor 22 implements the fractal-based clutter identification scheme of the present invention and operates to find only targets that it has been trained to find. Once the targets and clutter have been identified, display 24 can be used to either: 1) display targets, 2) display targets and clutter but in different fashions for easy visual discrimination, 3) display only clutter if same is of interest, 4) display detection areas only if same is of interest, or 5) display false targets if the output is compared to groundtruth for test images (i.e., in the non-real time case). Another use for the output would be to pass the features to a neural network which could process the features in order to determine which areas using these features are targets, false targets or non-targets. Using a neural network with these features would generally produce the highest $P_d P_c$ and lowest false target rate. In all cases, groups of fractal feature values are used in training for different classes of objects, e.g., mine-like targets and clutter. As with the classification scheme, a training session must be conducted on known data, or groundtruth. The groundtruth images should include various types of clutter as well known targets and their locations.

Using the groundtruth data, background images, and values passed from classification processor 20, fractal group features are calculated. Appropriate threshold limits for each calculated feature are set. Clutter identification thresholds are places where there appears to be significant breakpoints between target and clutter values for each feature. Training sessions can be conducted by running the classification and clutter identification schemes on the same known image set. Once all thresholds have been given a value, the clutter identification scheme is ready to be used on unknown images of the same type on which it was trained.

At this point, each of the originally detected objects (output from detection processor 18) has been classified as a target or rejected as a non-target (by classification processor 20). However, some of the positively-classified targets will not be the specific type of object that is being sought, but will be image clutter. Accordingly, the next step towards achieving a high $P_dP_c$ and low false target rate is to identify which positive-classified objects are actually part of large or extended objects that constitute image clutter. The clutter can be physical clutter or image clutter (bright areas) caused by other effects such as sensor motion or high reverberation levels.

Figure 2:
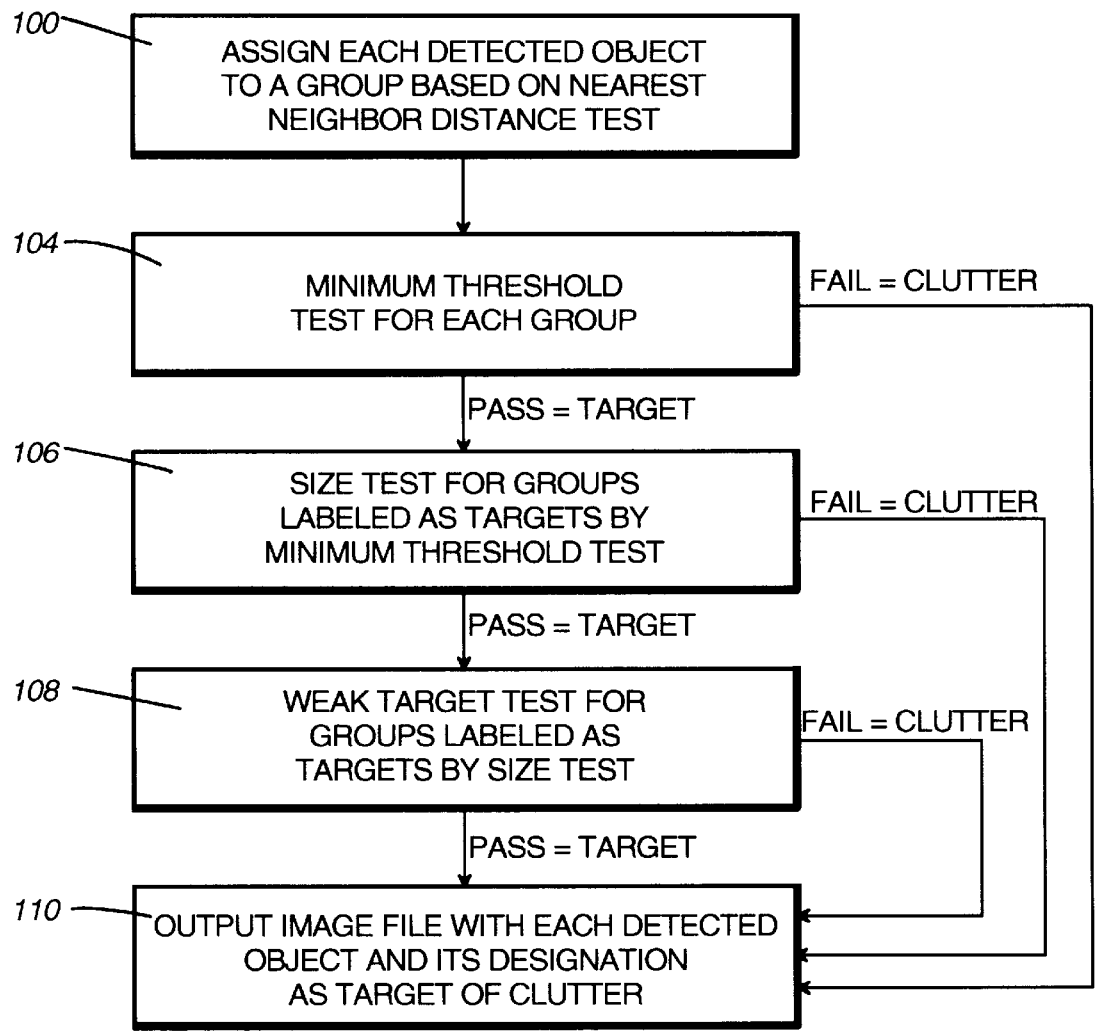
FIG. 2 is a top-level flowchart of the method of the present invention.

FIG. 2 depicts a top-level flowchart of the present method of clutter identification. First, at step 100, each detected object center ($X_c$,$Y_c$) generated by detection processor 20 is assigned to a group based on the object's distance to its nearest neighbor. From this point, the object is referred to by its group membership. Then, at least one test is performed by looping through all the groups and all the members of each group. The first test described at step 104 will always be applied. Additional tests can be applied depending on the features available from the detection and classification schemes. By way of example, two additional tests at steps 106 and 108 will be described herein. Failure of any one of these tests causes the group and each member thereof to be labeled as clutter.

At step 104, a minimum threshold test is applied to each group to determine if the group is sufficiently isolated to be considered a target or if the group is part of a larger clutter structure. Passing this test tentatively labels a group and each member thereof as targets. These groups and their members so labeled will then be further evaluated at step 106 which is a size test used to eliminate groups (tentatively labeled as targets at step 104) based on their size and/or shape. Once again, passing test 106 tentatively designates the group and each member thereof as targets whereas failure designates the group and its members as clutter. The last test at step 108 is intended to eliminate weak targets from test 106 using distributions calculated previously by the classification algorithm referenced above. The final result at step 110 is an image file containing every initially detected object center (from detection processor 18) and its designation as either a target or image clutter along with other related information. This information can then be used to produce an image at display 24 that either discriminates between targets and clutter or displays only those object retaining their target designation throughout all of the tests.

Figure 3:
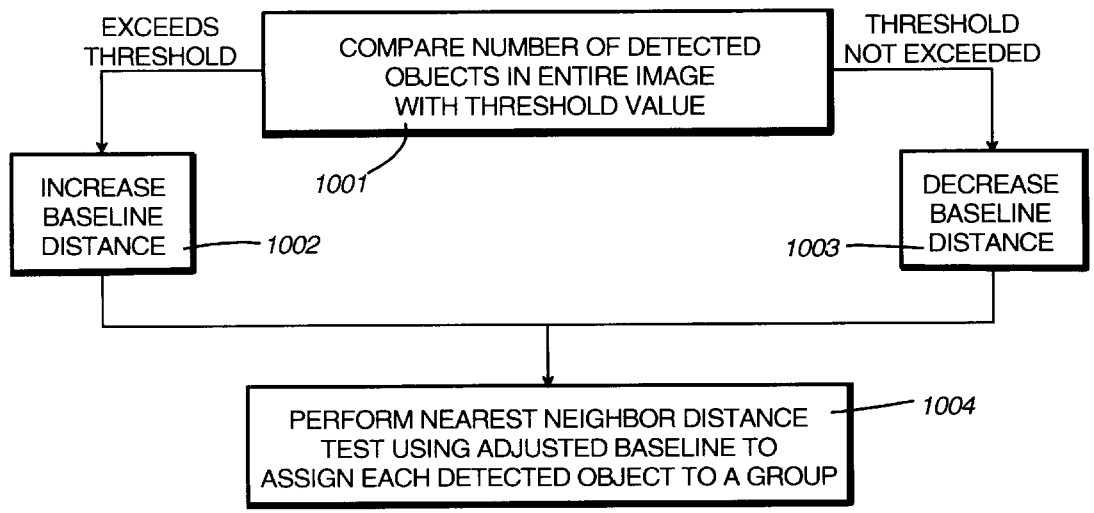
FIG. 3 is a flowchart of the steps used to assign each detected object to a group.

Step 100 of assigning each detected object to a group is illustrated in greater detail in FIG. 3. At step 1001, the number of detected objects (generated by detection processor 20) is compared with a given threshold value. If the number of detected objects exceeds the threshold set for an image to be considered cluttered, then a larger distance is allowed between objects in determining to which group they should be assigned. If the number of detected objects is less than the threshold set for an image to be considered cluttered, then the image is considered uncluttered and a smaller distance is required between objects in a group. Accordingly, a baseline distance is adjusted by either increasing same at step 1002 or decreasing same at step 1003. In either case, the maximum distance allowed is used at step 1004 where each detected object is assigned to a group based on the detected object's distance to its nearest neighbor. If the distance from the first object to the second object in the loop is less than the maximum allowable distance, then the second object belongs to the first group. If the distance is greater, the second object starts its own group. The same measurement is made between the third object in the loop and first two objects. This procedure continues until all the detected objects are assigned to a group. At the completion of step 1004, each detected object is assigned to a group.

Figure 4:
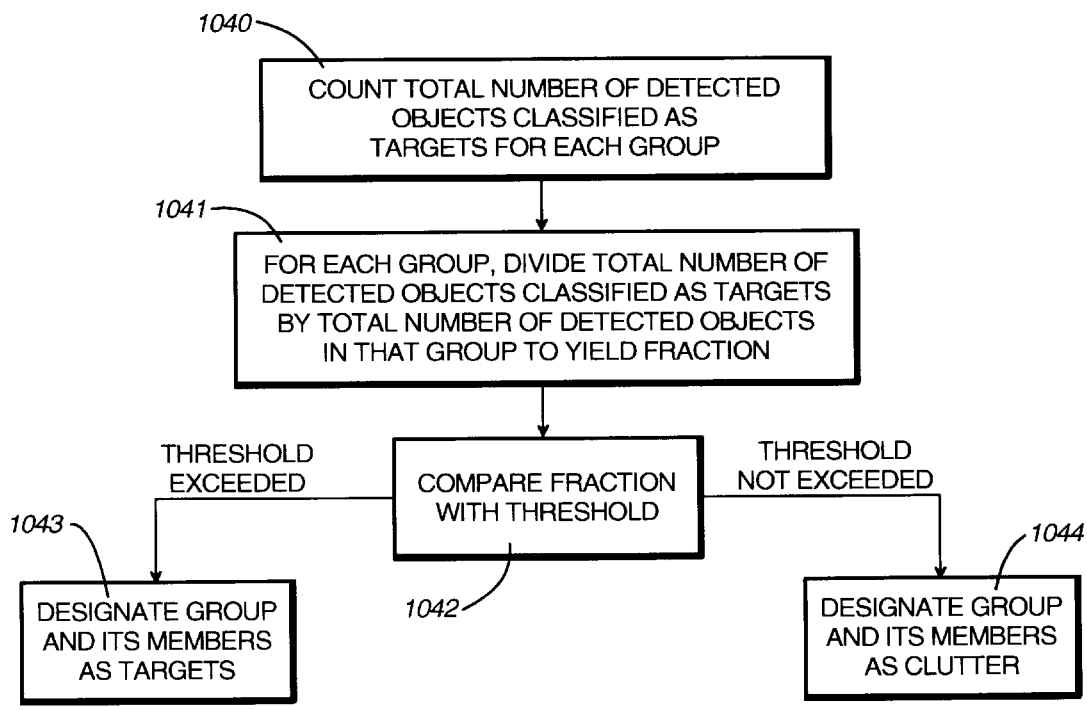
FIG. 4 is a flowchart of the minimum threshold test used in the present invention.
Figure 5:
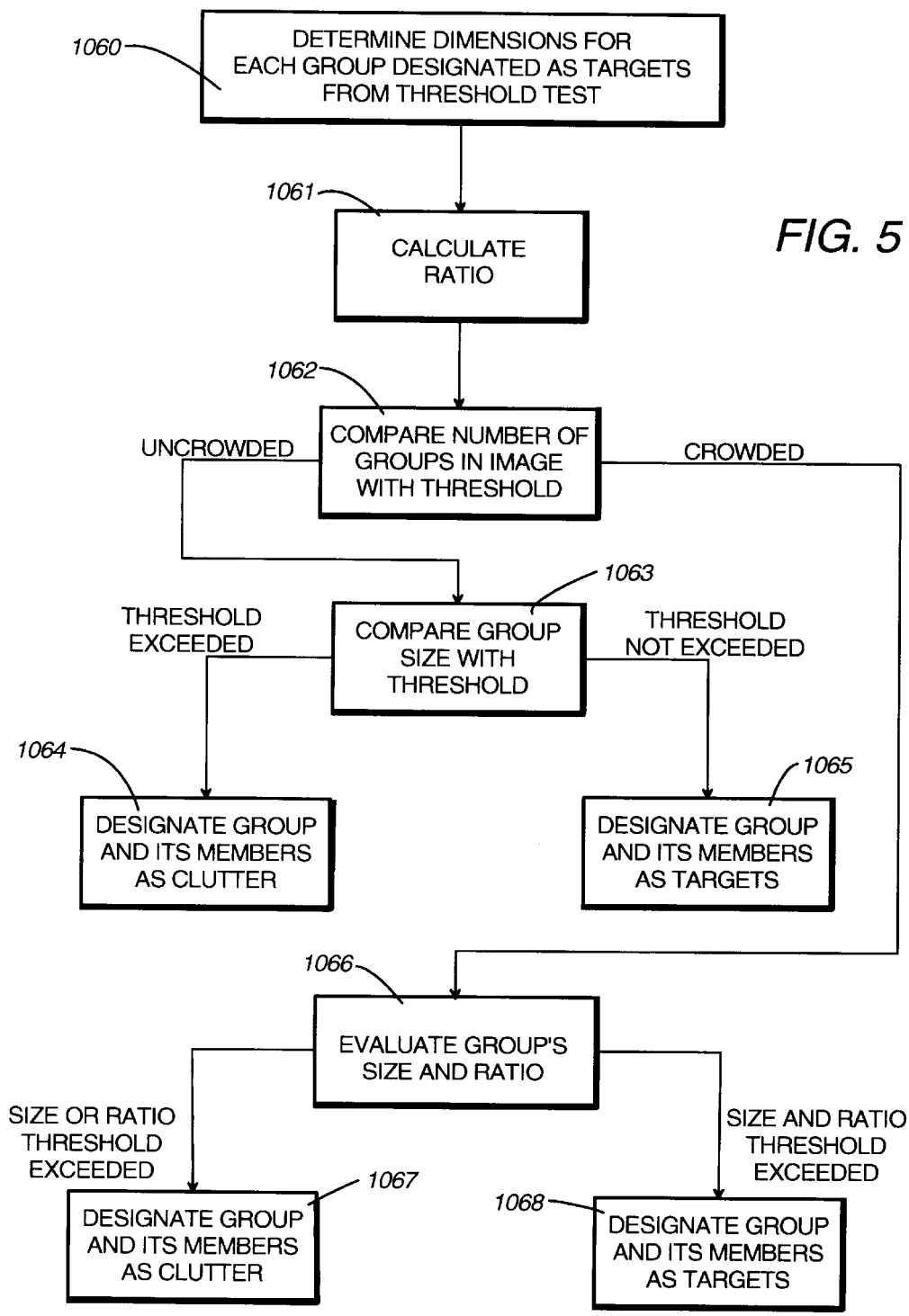
FIG. 5 is a flowchart of the size test used in the present invention.
Figure 6:
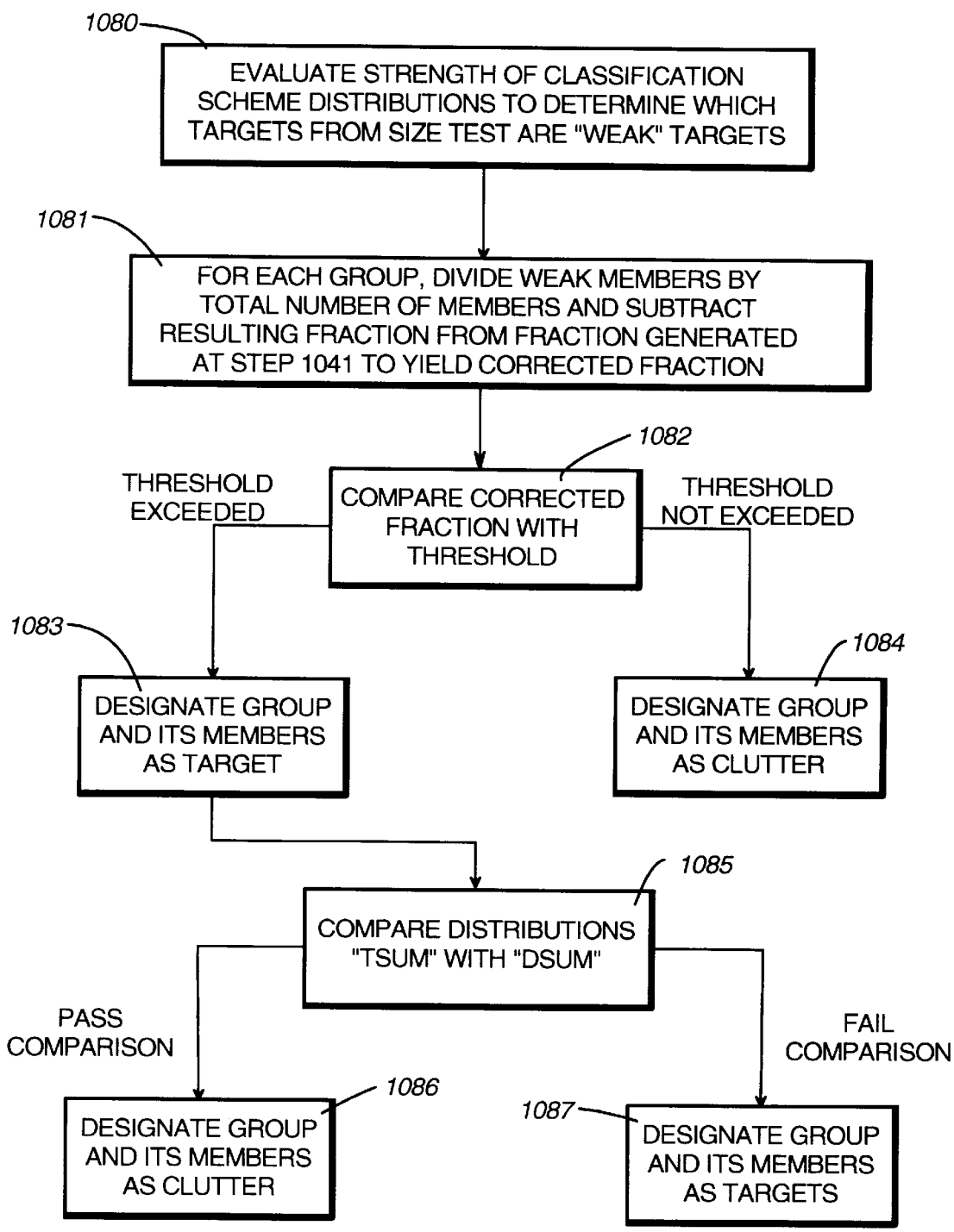
FIG. 6 is a flowchart of the weak target test used in the present invention.

Referring now to FIGS. 4, 5, and 6, the above-noted three tests will be described in further detail. In FIG. 4, the minimum threshold test is applied to each group. For each group, the total number of detected objects classified as targets by classification processor 20 is counted at step 1040. At step 1041, the count from step 1040 is divided by the number of members in that group. The resulting fraction or percentage is compared with a threshold value at step 1042. If the percentage of targets in the group is greater than or equal to the threshold, then the group and all its members are designated as targets at step 1043. If the percentage is less than the threshold, the group and all its members are designated as clutter at step 1044.

A size test can be applied to each group designated as a target by the minimum threshold test in FIG. 4. One such size test is outlined in FIG. 5 where, at step 1060, the dimensions of each group designated as targets at step 1043 (FIG. 4) are determined. The dimensions are determined by first calculating the absolute difference between the minimum $X_c$ and maximum $X_c$ (hereinafter referred to as GSIZX), and the absolute difference between the minimum $Y_c$ and the maximum $Y_c$ (hereinafter referred to as GSIZY) among group members designated as targets at step 1043. The absolute differences are used to determine the group's size by squaring the absolute differences, summing the squares, and taking the square root of such sum. At step 1061, a ratio is calculated for each group by dividing the maximum of GSIZX and GSIZY by the minimum of GSIZX and GSIZY. In order to determine which (size) tests are applied to a group, it must first be determined whether or not the image is crowded. To do this, the number of groups in the image is compared with an established threshold at step 1062. For an image that is uncrowded (i.e., the number of groups does not exceed the threshold), only group size is evaluated at step 1063 where a group having a size larger than an established threshold is designated as clutter along with its members at step 1064. A group having a size less than the established threshold is designated as a target along with its members at step 1065. For an image that is crowded (i.e., the number of groups exceeds the threshold), each group is evaluated at step 1066 in terms of both size and ratio. A group having a size or ratio larger than established thresholds is designated as clutter along with its members at step 1067. A group having a size and ratio less than established thresholds is designated as a target along with its members at step 1068.

Finally, the strength or weakness of a group designated as a target at either of steps 1065 or 1068 can be evaluated. How this is accomplished depends on the features available for each group and its members. By way of example, two such tests will be described based on available features from the classification scheme described by the above-referenced patent application Ser. No. 08/629,709. The two tests are outlined in FIG. 6 where, at step 1080, the distributions (e.g., TSUM and DSUM described in the above-referenced patent application) calculated by the classification scheme are compared to established thresholds for each member of the "target" groups (from steps 1065 and 1068) in order to determine the number of "weak" targets. At step 1081, the number of weak members is divided by the total number of members in the group to yield a fraction that is subtracted as an update or correction to the fraction determined at step 1041. This corrected fraction is then compared with a threshold (i.e., the same threshold used in step 1042) at step 1082. If the threshold is exceeded, the group and its members are continued to be designated as targets at step 1083. If the threshold is not exceeded, the group and its members are designated as clutter at step 1084.

A second strength or weakness test can be applied to those groups/members retaining their target designation from step 1083. In the second test, the distributions (e.g., TSUM and DSUM) are compared with one another at step 1085. For example, in operational tests of the present invention, DSUM was compared with a value equal to twice TSUM. Passing this comparison test causes a group and its members to be designated as clutter at step 1086, while failing this comparison causes a group and its members to be designated as targets at step 1087.

The advantages of the present invention are numerous. The present method uses the distribution of several high-order (i.e., beyond the simple fractal dimension) fractal features to differentiate targets from clutter. Clutter identification is completely independent of the type of detector and classifier used to initially detect and classify possible targets in an image. The present invention can be used with sonar or other image data that must be evaluated in the presence of clutter. Such clutter is automatically and systematically identified thereby allowing the system operator to concentrate on a reduced set of targets that have a high-level of confidence.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of identifying clutter in an image represented by a two-dimensional array of pixel intensities, said method comprising the steps of:

applying a detection scheme to said two-dimensional array to identify portions of said image having a signal-to-noise ratio greater than a given threshold, wherein each of said portions is centered at a position in said image that is represented by a two-dimensional coordinate pair generated by said detection scheme;

applying a classification scheme to each of said portions to generate fractal feature values associated therewith, wherein each of said portions is classified as being one of a target and non-target based on said fractal feature values associated with each of said portions;

assigning each of said portions to a group based on a distance from said position of each of said portions to another of said portions that is its nearest neighbor; and performing at least one test for each said group using said fractal feature values associated with each of said portions in each of said groups, wherein a failure of any of said at least one test by any one of each said group identifies each of said portions associated with said any one of each said group as clutter in said image.

2. A method according to claim 1 wherein said step of assigning includes the step of determining each said distance based on the number of said portions in said image.

3. A method according to claim 2 wherein said step of determining includes the steps of:

providing a baseline distance; and altering said baseline distance based on the number of portions in said image.

4. A method according to claim 3 wherein said step of altering comprises the step of increasing said baseline distance when the number of said portions exceeds a given threshold number.

5. A method according to claim 3 wherein said step of altering comprises the step of decreasing said baseline distance when the number of said portions is less than or equal to a given threshold number.

6. A method according to claim 1 wherein, for each said group, said step of performing includes the steps of:

counting the number of said portions classified as being said target based on said classification scheme;

dividing the number of said portions classified as being said target based on said classification scheme by the total number of said portions associated with said group to generate a fraction; and designating said each group and each of said portions in said each group as being one of said target and said non-target based on said fraction, wherein a designation of a group and its portions as being said non-target based on said fraction is indicative of said failure.

7. A method according to claim 6 wherein, for each said group and its portions designated as being said target based on said fraction, said step of performing further includes the steps of:

determining dimensions for each said group and its portions designated as being said target based on said fraction; and designating each said group and its portions designated as being said target based on said fraction as being one of said target and said non-target based on said dimensions, wherein a designation of a group and its portions as being said non-target based on said dimensions is indicative of said failure.

8. A method according to claim 1 further comprising the step of normalizing said pixel intensities prior to said step of applying said detection scheme.

9. A method of identifying clutter in a sonar image comprising the steps of:

providing a two-dimensional array of pixel intensities representative of said sonar image;

normalizing said pixel intensities;

applying a detection scheme to said two-dimensional array to identify portions of said sonar image having a signal-to-noise ratio greater than a given threshold, wherein each of said portions is centered at a position in said image that is represented by a two-dimensional coordinate pair generated by said detection scheme;

applying a classification scheme to each of said portions to generate fractal feature values associated therewith, wherein each of said portions is classified as being one of a target and non-target based on said fractal feature values associated with each of said portions;

assigning each of said portions to a group based on a distance from said position of each of said portions to another of said portions that is its nearest neighbor; and performing a series of tests for each said group using said fractal feature values associated with each of said portions in each of said groups, wherein a failure of any of said series of tests by any one of each said group identifies each of said portions associated with said any one of each said group as clutter in said sonar image.

10. A method according to claim 9 wherein said step of applying said classification scheme includes the steps of:

determining, for each said two-dimensional coordinate pair, fractal dimension values for each of at least two differently sized windows of said sonar image encompassing said two-dimensional coordinate pair; and determining magnitude and direction of a gradient between said fractal dimension values of said at least two differently sized windows associated with each said two-dimensional coordinate pair.

11. A method according to claim 10 wherein said step of assigning includes the step of determining each said distance based on the number of said portions in said sonar image.

12. A method according to claim 11 wherein said step of determining includes the steps of:

providing a baseline distance; and altering said baseline distance based on the number of portions in said sonar image.

13. A method according to claim 12 wherein said step of altering comprises the step of increasing said baseline distance when the number of said portions exceeds a given threshold number.

14. A method according to claim 12 wherein said step of altering comprises the step of decreasing said baseline distance when the number of said portions is less than or equal to a given threshold number.

15. A method according to claim 10 wherein, for each said group, said step of performing includes the steps of:

counting the number of said portions classified as being said target based on said classification scheme;

dividing the number of said portions classified as being said target based on said classification scheme by the total number of said portions associated with said group to generate a fraction; and designating said each group and each of said portions in said each group as being one of said target and said non-target based on said fraction, wherein a designation of a group and its portions as being said non-target based on said fraction is indicative of said failure.

16. A method according to claim 15 wherein, for each said group and its portions designated as being said target based on said fraction, said step of performing further includes the steps of:

determining dimensions for each said group and its portions designated as being said target based on said fraction; and designating each said group and its portions designated as being said target based on said fraction as being one of said target and said non-target based on said dimensions, wherein a designation of a group and its portions as being said non-target based on said dimensions is indicative of said failure.

* * * * *